(12) United States Patent
Wheatley

(10) Patent No.: US 9,290,957 B1
(45) Date of Patent: *Mar. 22, 2016

(54) STRUCTURE REINFORCEMENT SYSTEM AND METHOD

(71) Applicant: Fortress Stabilization Systems, Holland, MI (US)

(72) Inventor: Donald E. Wheatley, Holland, MI (US)

(73) Assignee: Fortress Stabilization Systems, Holland, MI (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/795,328

(22) Filed: Jul. 9, 2015

Related U.S. Application Data

(63) Continuation-in-part of application No. 14/588,166, filed on Dec. 31, 2014.

(51) Int. Cl.
*E04G 23/02* (2006.01)
*F16B 13/00* (2006.01)
*E04C 5/07* (2006.01)

(52) U.S. Cl.
CPC ........ *E04G 23/0222* (2013.01); *E04G 23/0229* (2013.01); *F16B 13/00* (2013.01); *E04C 5/073* (2013.01)

(58) Field of Classification Search
CPC . E04G 23/0222; E04G 23/0229; F16B 13/00; E04C 5/073
See application file for complete search history.

(56) References Cited

U.S. PATENT DOCUMENTS

| | | | | |
|---|---|---|---|---|
| 4,474,493 A * | 10/1984 | Welch | ........................ | 403/408.1 |
| 4,581,870 A * | 4/1986 | Winkowski | .................. | 52/489.2 |
| 5,018,331 A * | 5/1991 | Forzano | .......................... | 52/514 |
| 5,649,398 A * | 7/1997 | Isley et al. | .................. | 52/309.17 |
| 5,657,595 A * | 8/1997 | Fyfe et al. | ........................ | 52/252 |
| 5,987,835 A * | 11/1999 | Santarossa | ....................... | 52/417 |
| 6,145,260 A * | 11/2000 | Morton | ........................ | 52/293.2 |
| 6,330,776 B1 * | 12/2001 | Jinno et al. | .................... | 52/649.1 |
| 6,389,775 B1 * | 5/2002 | Steiner | ................ | E04G 23/0218 52/293.2 |
| 6,418,684 B1 | 7/2002 | Morton | | |
| 6,571,524 B2 * | 6/2003 | Pantelides et al. | ........... | 52/582.1 |
| 6,692,595 B2 | 2/2004 | Wheatley et al. | | |
| 6,746,741 B2 | 6/2004 | Wheatley | | |
| 6,846,537 B2 | 1/2005 | Wheatley et al. | | |
| 6,851,232 B1 * | 2/2005 | Schwegler | .................... | 52/223.8 |
| 7,743,585 B2 * | 6/2010 | Wheatley | ..................... | 52/746.1 |
| 7,799,154 B2 * | 9/2010 | Wu | .................................. | 156/71 |
| 7,823,354 B2 | 11/2010 | Wheatley | | |

(Continued)

OTHER PUBLICATIONS

Middle East Technical University; "Anchorage Strength of Fiber Reinforced Polymers"; Thesis by Umit Serdar Camli; Nov. 2005 (97 pages).

(Continued)

*Primary Examiner* — Rodney Mintz
(74) *Attorney, Agent, or Firm* — Harness, Dickey & Pierce, P.L.C.

(57) ABSTRACT

A reinforcement system includes a structural member such as a concrete wall including a pair of holes formed therein. A fiber reinforcement strip is adhered to the structural member between the pair of holes. A U-shaped bracket includes a pair of legs being secured in the pair of holes and a bridge portion that overlaps the fiber reinforcement strip, wherein the first end of the fiber reinforcement strip is wrapped around the bridge portion and adhered to an intermediate portion of the fiber reinforcement strip.

18 Claims, 6 Drawing Sheets

(56) References Cited

U.S. PATENT DOCUMENTS

Figure 1:
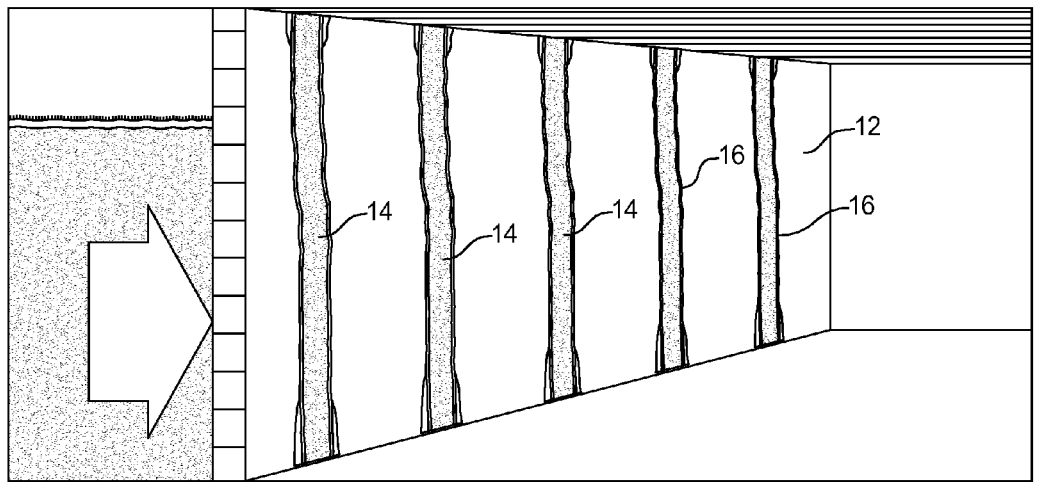

| | | | | |
|---|---|---|---|---|
| 8,142,102 | B2* | 3/2012 | Wheatley | 404/31 |
| 8,201,380 | B2* | 6/2012 | Hargest et al. | 52/745.1 |
| 8,367,569 | B2* | 2/2013 | Wheatley | 442/314 |
| 8,578,670 | B2* | 11/2013 | Wu et al. | 52/223.6 |
| 8,584,431 | B2 | 11/2013 | Secrest | |
| 8,776,474 | B2* | 7/2014 | Wu et al. | 52/698 |
| 8,925,268 | B2* | 1/2015 | Tourneur et al. | 52/309.1 |
| 8,991,132 | B2* | 3/2015 | Jung | B21C 37/121 29/897.34 |
| 9,010,047 | B2* | 4/2015 | Wu et al. | 52/223.1 |
| 9,034,775 | B2* | 5/2015 | Wheatley | 442/20 |
| 9,085,898 | B2* | 7/2015 | Arnold | |
| 9,194,140 | B2* | 11/2015 | Hemphill | E04G 23/0218 52/514 |
| 2001/0047844 | A1* | 12/2001 | Edwards | B29C 70/088 156/91 |
| 2001/0049399 | A1* | 12/2001 | Edwards | E04C 5/073 521/101 |
| 2002/0033000 | A1* | 3/2002 | Pantelides et al. | 52/745.05 |
| 2003/0099525 | A1* | 5/2003 | Michels | 411/431 |
| 2005/0100399 | A1* | 5/2005 | Welch | 403/292 |
| 2005/0241260 | A1* | 11/2005 | Wheatley | 52/719 |
| 2006/0059827 | A1* | 3/2006 | Wheatley | 52/506.05 |
| 2007/0272353 | A1* | 11/2007 | Wheatley et al. | 156/304.3 |
| 2008/0000571 | A1* | 1/2008 | Wu | 156/71 |
| 2009/0071085 | A1 | 3/2009 | Wheatley et al. | |
| 2010/0319289 | A1* | 12/2010 | Hargest et al. | 52/565 |
| 2011/0219710 | A1* | 9/2011 | Fyfe | 52/167.1 |
| 2012/0056051 | A1* | 3/2012 | Gold | 248/222.14 |
| 2012/0110940 | A1* | 5/2012 | Hemphill | E04G 23/0218 52/514 |
| 2012/0180412 | A1* | 7/2012 | Secrest | 52/222 |
| 2013/0008111 | A1* | 1/2013 | Wu et al. | 52/309.17 |
| 2013/0008120 | A1* | 1/2013 | Wu et al. | 52/698 |
| 2013/0167755 | A1* | 7/2013 | Jung | E04C 5/02 106/638 |
| 2013/0199715 | A1* | 8/2013 | Fyfe et al. | 156/252 |
| 2013/0316104 | A1* | 11/2013 | Adam | B28B 13/021 428/34.5 |
| 2014/0245695 | A1* | 9/2014 | Arnold | 52/831 |

OTHER PUBLICATIONS

APFIS 2009; "FRP Anchors: Recent Advances in Research and Understanding"; S.T. Smith; Dec. 2009 (10 pages).

APFIS 2012; "FRP Anchorage Systems for Infill Masonry Structures"; Lunn et al; Feb. 2012 (8 pages).

University of Massachusetts—Amherst; "Anchorage of Carbon Fiber Reinforced Polymers to Reinforced Concrete in Shear Applications"; Thesis by Carl W. Niemitz; Feb. 2008 (335 pages).

University of Waterloo; "Effect of FRP Anchors on the FRP Rehabilitation of Shear Critical RC Beams and Flexure Critical RC Slabs"; Thesis by Daniel Frank Baggio; 2013 (293 pages).

* cited by examiner

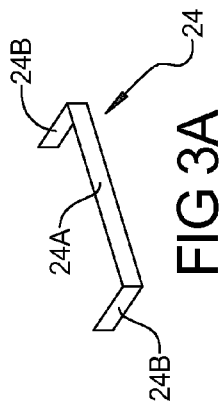
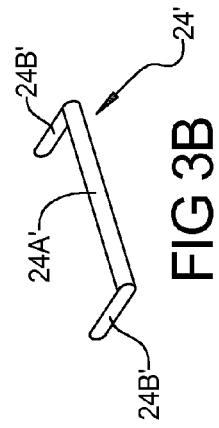
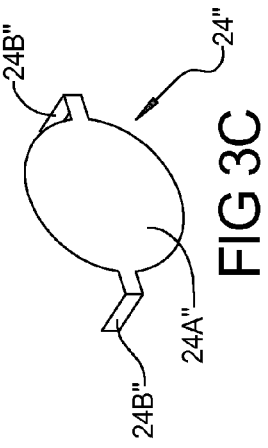
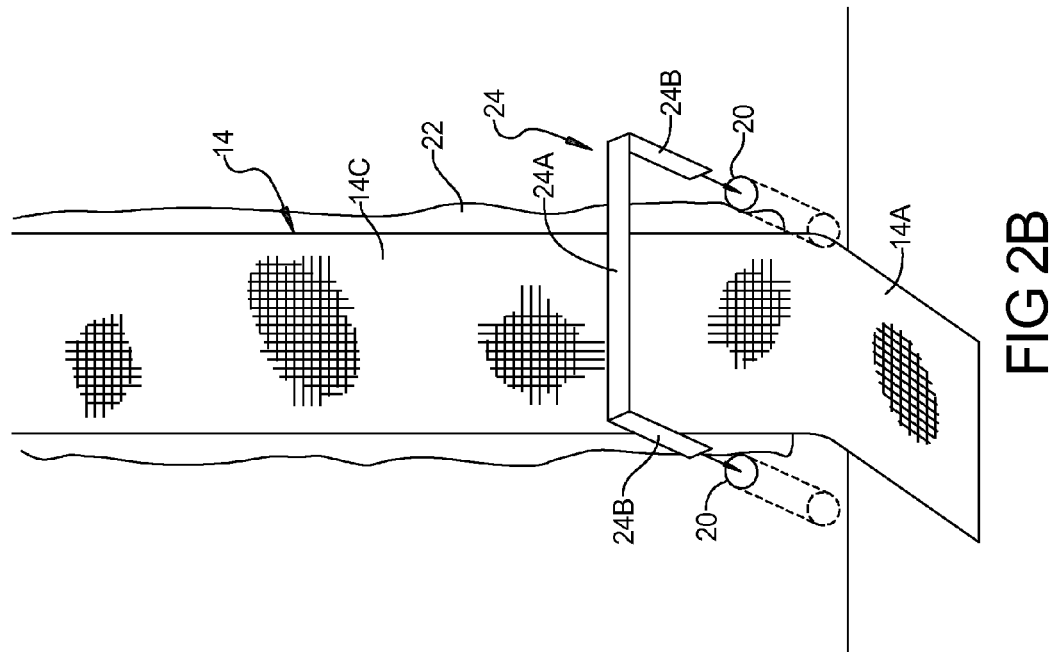

STRUCTURE REINFORCEMENT SYSTEM AND METHOD

CROSS-REFERENCE TO RELATED APPLICATIONS

This application is a continuation-in-part of U.S. patent application Ser. No. 14/588,166, filed on Dec. 31, 2014. The entire disclosure of the above application is incorporated herein by reference.

FIELD

The present disclosure relates to a system and method for reinforcing structural elements. In particular, the present disclosure relates to a system and method for structural member reinforcement including an anchor system for anchoring a reinforcement material to a concrete, masonry, or timber wall or other structural member, such as a column, beam, floor, or ceiling.

BACKGROUND

The statements in this section merely provide background information related to the present disclosure and may not constitute prior art.

A variety of walls and other structural elements are known to be generally capable of supporting residential and light commercial structures. Over time, however, such walls and structural elements can crack, tilt, bow, or otherwise deform due to inherent weaknesses attributable to particular structural characteristics thereof.

For example, walls constructed of concrete blocks have excellent compressive strength to support structures placed upon them. However, these walls are inherently weak with respect to lateral loads and are particularly susceptible to cracking from water pressure, as the mortar joints at which these walls are connected are weak in tension and tend to separate relatively easily when subjected to tensile forces.

Deformation, such as cracking, tilting, and bowing, if left untreated, can become progressively greater and eventually facilitate collapse of an entire structural element with resultant damage to the structure supported thereon. While several methods are known for treating such deformation (e.g., it is known to adhere a carbon fiber material to a structural element, such as described in U.S. Pat. Nos. 6,692,595; 6,746,741; and 6,846,537), it would be desirable for a relatively simple and cost effective system and method for anchoring a fiber reinforcement material to a wall structure in order to treat, prevent, or otherwise inhibit deformation of the structural element.

SUMMARY

This section provides a general summary of the disclosure, and is not a comprehensive disclosure of its full scope or all of its features.

The present disclosure provides a reinforcement system for a structural element, such as a wall, column, beam, floor, or ceiling. The reinforcement system includes a concrete, masonry, or timber structural member, including a pair of holes formed therein. A fiber reinforcement strip is adhered to the structural member between the pair of holes. A U-shaped bracket includes a pair of legs being secured within the pair of holes and a bridge portion that overlaps the fiber reinforcement strip. The first end of the fiber reinforcement strip can be wrapped around the bridge portion and adhered to an intermediate portion of the fiber reinforcement strip.

According to a further aspect of the present disclosure, the U-shaped bracket can also include a widened bridge portion in order to increase the surface area for adhering the U-shaped bracket to the fiber reinforcement strip and the structural member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 3D:
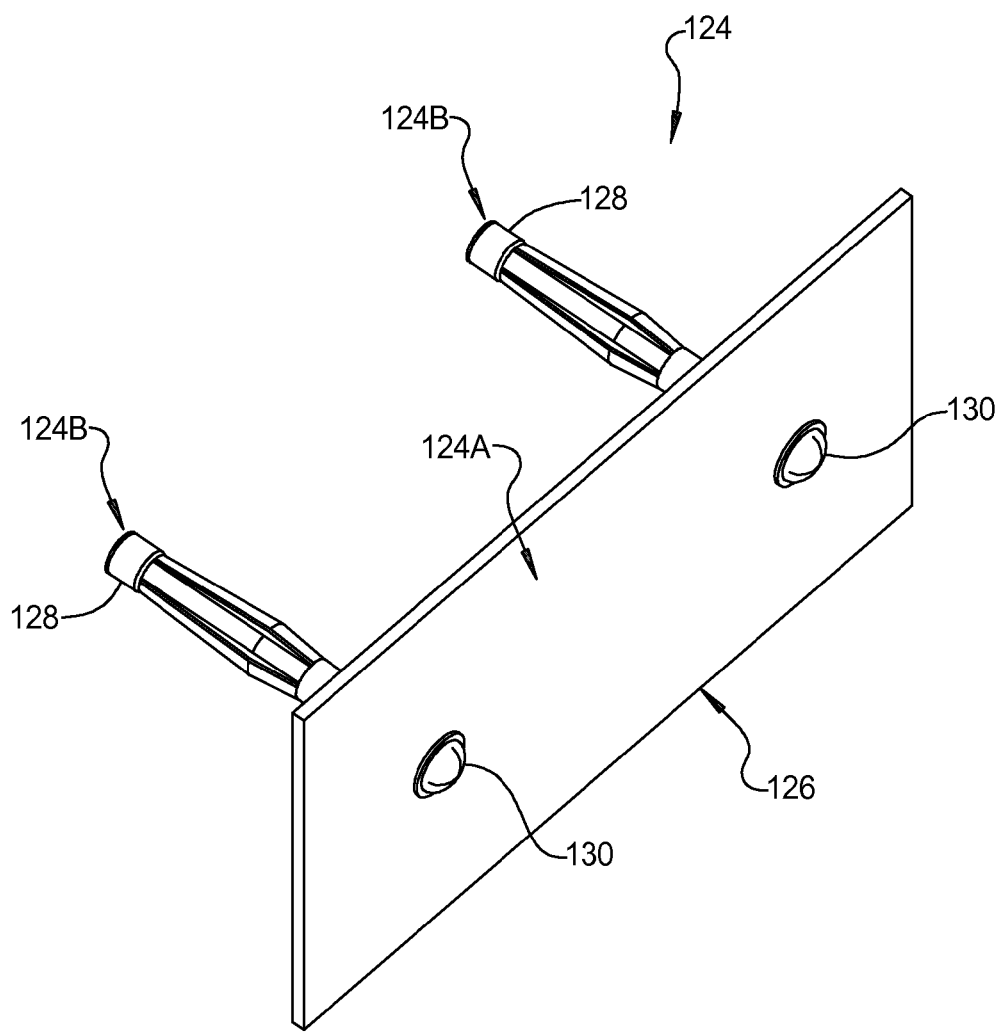
Figure 4:
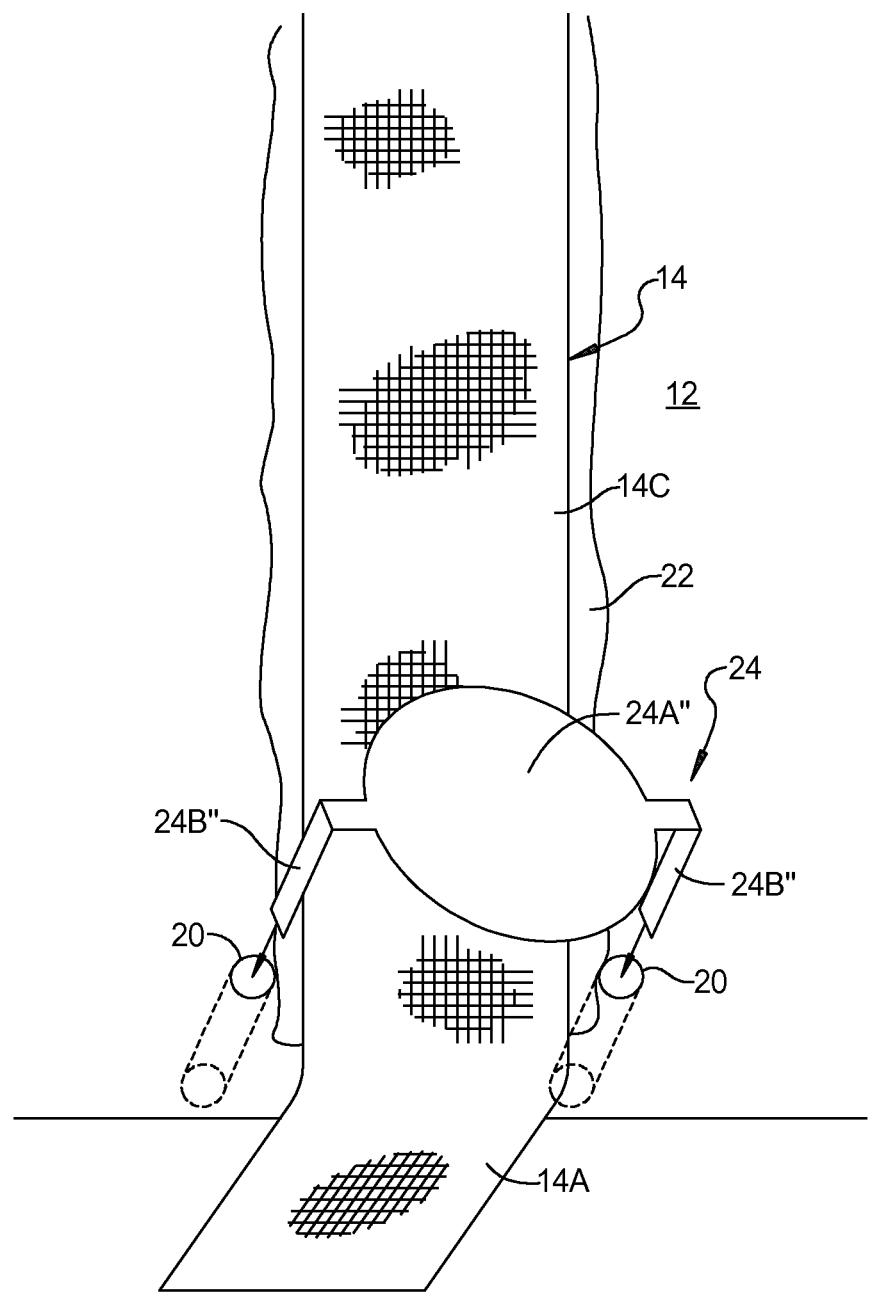

FIG. 1 illustrates an exemplary wall for use with a reinforcement system and method according to the principles of the present disclosure;

FIGS. 2A, 2B, 2C, and 2D illustrate exemplary steps for installing a reinforcement system and for a reinforcement method according to the principles of the present disclosure;

FIGS. 3A, 3B, 3C, and 3D illustrate exemplary brackets used for anchoring the fiber reinforcement material to the wall structure; and FIG. 4 illustrates a bracket having a widened bridge portion for anchoring a fiber reinforcement strip to a wall structure according to a further aspect of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1 reinforcement system 10 can be utilized with a structural member 12 that can include a block wall, brick wall, a poured concrete wall, a timber wall, a concrete pillar, beam, ceiling, floor, or other concrete structure. Reinforcement system 10 can be installed as fiber reinforcement strips 14 that can be adhered to the structural member 12. FIG. 1 illustrates exemplary installation locations 16 for reinforcement system 10 relative to wall structure 12. It should be understood that the installation locations 16 can vary depending upon the direction in which reinforcement is required. Therefore, the fiber reinforcement strips 14 can extend vertically (as shown) or alternatively horizontally or diagonally as desired.

Figure 2A:
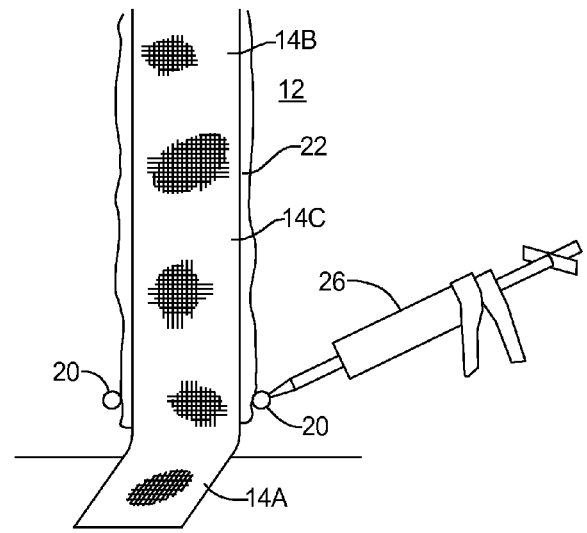
Figure 2C:
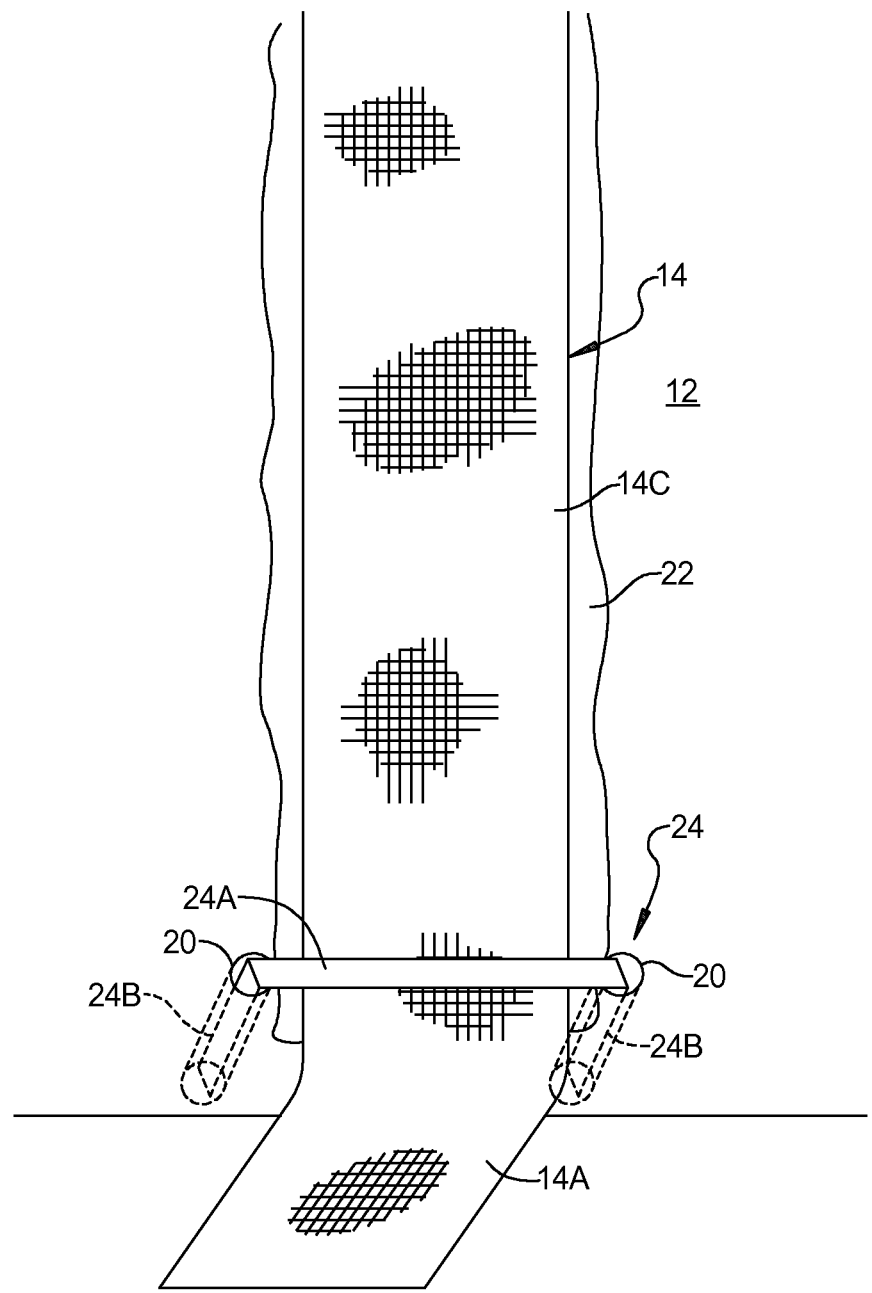
Figure 2D:
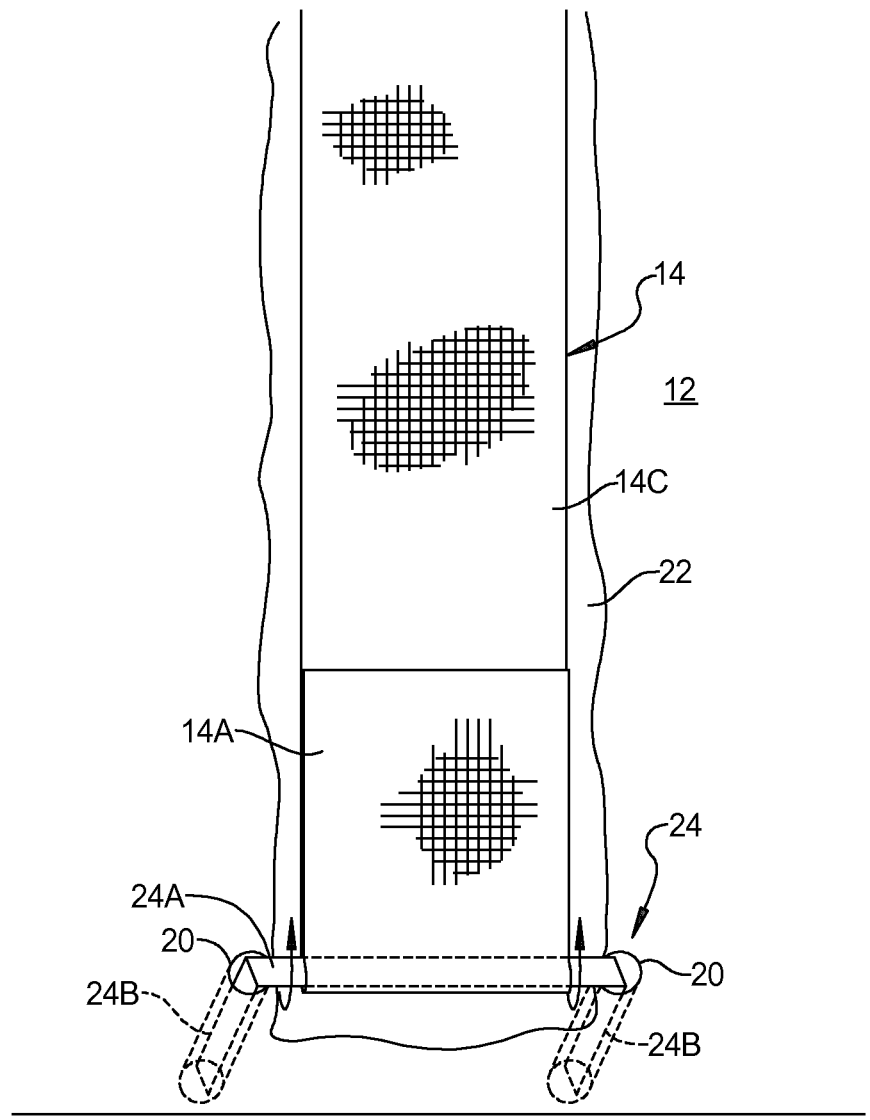

With particular reference to FIGS. 2A-2D, exemplary steps for installing reinforcement system 10 and for a reinforcement method according to the present disclosure are illustrated. Referring to FIG. 2A a pair of holes 20 are formed in the structural member 12. The pair of holes 20 can be formed at a base of a wall, top of the wall or at another location on a structural member 12. The fiber reinforcement strip 14 is adhered to the structural member 12 between the pair of holes 20 by an adhesive 22. The fiber reinforcement strip includes a first end 14A, a second end 14B and an intermediate portion 14C disposed between the first and second ends 14A, 14B. Adhesive is injected into the pair of holes 20 via a caulking gun 26 (FIG. 2A) or other device. As shown in FIG. 2B, a bracket 24 is provided including a bridge portion 24A and a pair of end legs 24B disposed at opposite ends of the bridge portion 24A. As shown in FIG. 2C, the pair of end legs 24B of the bracket 24 are inserted into the pair of holes 20. As shown in FIG. 2D, the first end 14A of the fiber reinforcement strip 14 can then be folded around the bridge portion 24A of the bracket 24 and can be adhered to the intermediate portion 14C of the fiber reinforcement strip 14. The second end 14B of the fiber reinforcement strip 14 can be anchored to the structural member 12 in a similar way or can alternatively be mounted to other structures such as a sill plate by a bracket or other techniques.

The fiber reinforcement strips 14 can include a number of longitudinal fiber bundles and a plurality of transverse fiber bundles that can be woven together or otherwise layered to form a flexible reinforcement strip. The fibers can include carbon fibers or other fibers such as Kevlar, nylon or other synthetic or natural fibers that exhibit strong tensile strength.

As shown in FIG. 3A, the brackets 24 can be formed from a number of longitudinal fiber bundles and a plurality of transverse fiber bundles that can be woven together or otherwise layered to form a flexible reinforcement strip. The fibers can include carbon fibers or other fibers such as Kevlar, nylon or other synthetic or natural fibers that exhibit strong tensile strength. The reinforcement strip can be coated with an epoxy or adhesive and allowed to cure in the U-shape configuration having a bridge portion 24A and a pair of legs 24B, as disclosed in the commonly assigned U.S. Pat. No. 7,823,354. Alternatively, the brackets 24' can be made from metal or other materials that can be formed in the U-shape configuration as disclosed, as shown in FIG. 3B.

As shown in FIG. 3D, the brackets 124 can be made from a plate 126 defining a bridge portion 124A and a pair of molly fasteners or other anchors 128 inserted through a pair of apertures 130 in the plate 126 and defining a pair of legs 124B. The plate 124A can be made from steel, other metals or other materials, such as plastic or other fiber reinforced material. If molly fasteners are used, the molly fasteners can be inserted into the holes 20 in the structural member 12 and mechanically expanded to secure the fasteners within the holes 20. Molly fasteners generally include a sleeve that receives a screw which when screwed into the sleeve causes the sleeve to expand outward and spread to trap the expanded sleeve within the hole 20. If other anchors 128 are used, the anchors can be inserted into the holes 20 and secured therein with an adhesive. For reinforcing a block wall, it is preferred that the brackets 24/124 are secured to the lowest course of blocks which are typically partially covered by a concrete floor that secures the blocks from being pulled inward.

With reference to FIG. 3C, the brackets 24" can be provided with a widened bridge portion 24A". By "widened bridge portion" it is meant that the bridge portion 24A" has a width that is wider than a width of the legs 24B. The widened bridge portion 24A" can be formed in various ways including being formed integrally with the pair of legs 24B" or can alternatively be formed separately from and then adhered to a bracket 24. The widened bridge portion can have various shapes, including circular, oval, rectangular, square or other desired shapes. The brackets 24" can be formed from a number of longitudinal fiber bundles and a plurality of transverse fiber bundles that can be woven together or otherwise layered to form a flexible reinforcement strip. The fibers can include carbon fibers or other fibers such as Kevlar, nylon or other synthetic or natural fibers that exhibit strong tensile strength. The reinforcement strip can be coated with an epoxy or adhesive and allowed to cure in the U-shape configuration 24". Alternatively, the brackets 24" can be made from metal or other materials that can be formed in the U-shape configuration as disclosed.

The brackets 24, 24', 24" can also be mounted at an intermediate location along a fiber reinforcement strip 14 to secure the fiber reinforcement strip 14 to a structural member. In particular, as shown in FIG. 4, a U-shaped bracket 24" having a widened bridge portion 24A" is shown with the legs 24B" adhered in a pair of holes 20 and with the widened bridge portion 24A" overlapping the fiber reinforcement strip 14.

The pair of holes 20 that are formed in the structural member 12 can be formed by drilling, cutting or other techniques. Mesh screens or other containment devices can be inserted into the pair of holes 20 in order to contain the adhesive that is injected therein while the adhesive cures. The present disclosure can vary in many ways. For example, a reinforcement system according to the principles of the present disclosure can have a variety of components which each can have a variety of configurations and can be made of a variety of materials. Furthermore, the installation steps for a reinforcement system according to the principles of the present disclosure and reinforcement methods according to the principles of the present disclosure can vary. Additionally, a reinforcement system and method according to the principles of the present disclosure can be used in a variety of applications. As such, it should be understood that the present disclosure is exemplary in nature.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wall reinforcement system, comprising:
   a wall structure including a pair of holes formed therein;
   a fiber reinforcement strip adhered to the wall structure between the pair of holes, the fiber reinforcement strip having a first end, a second end and an intermediate portion disposed between the first and second ends; and
   a bracket having a bridge portion disposed between a pair of legs, the pair of legs being fixedly secured within the pair of holes and the bridge portion overlapping the fiber reinforcement strip, wherein the first end of the fiber reinforcement strip is folded and wrapped around the bridge portion and adhered to the intermediate portion of the fiber reinforcement strip.

2. The wall reinforcement system according to claim 1, wherein the fiber reinforcement strip is made from carbon fibers.

3. The wall reinforcement system according to claim 1, wherein the bracket includes a plate defining the bridge portion and having a pair of apertures and further including a pair of fasteners inserted through the apertures for defining the pair of legs.

4. The wall reinforcement system according to claim 3, wherein the plate is made from metal.

5. The wall reinforcement system according to claim 3, wherein the pair of fasteners include a pair of molly fasteners that are mechanically expanded to secure the fasteners in the holes.

6. The wall reinforcement system according to claim 3, wherein said pair of fasteners are fixedly secured in the holes by an adhesive that is injected into the holes.

7. A method of reinforcing a structural member, comprising the steps of:
   forming a pair of holes at a base of the structural member;
   adhering a fiber reinforcement strip from the base of the structural member to a top of the structural member and between the pair of holes, the fiber reinforcement strip having a lower end, an upper end and an intermediate portion disposed between the upper and lower ends;
   providing a bracket having a bridge portion and a pair of legs extending from opposite ends of the bridge portion, and securing the pair of legs into the pair of holes with the bridge portion overlapping the fiber reinforcement strip; and
   folding the lower end of the fiber reinforcement strip around the bridge portion of the bracket and adhering the lower end of the fiber reinforcement strip to the intermediate portion of the fiber reinforcement strip.

8. The method according to claim 7, wherein the fiber reinforcement strip is made from carbon fibers.

9. The method according to claim 7, wherein the bracket includes a plate defining the bridge portion and having a pair of apertures and further including a pair of fasteners inserted through the apertures for defining the pair of legs.

10. The method according to claim 9, wherein the plate is made from metal.

11. The method according to claim 9 wherein the pair of fasteners include a pair of molly fasteners that are mechanically expanded to secure the fasteners in the holes.

12. The method according to claim 9, wherein said pair of fasteners are secured in the holes by an adhesive that is injected into the holes.

13. A method of reinforcing a structure, comprising the steps of:
   forming a pair of holes in the structure;
   adhering a fiber reinforcement strip to the structure between the pair of holes, the fiber reinforcement strip having a first end, a second end and an intermediate portion disposed between the first and second ends;
   providing a bracket having a bridge portion and a pair of legs extending from opposite ends of the bridge portion, and securing the pair of legs into the pair of holes with the bridge portion overlapping the fiber reinforcement strip; and
   folding the first end of the fiber reinforcement strip around the bridge portion of the bracket and adhering the first end of the fiber reinforcement strip over top of a region of the intermediate portion the fiber reinforcement strip.

14. The method according to claim 13, wherein the fiber reinforcement strip is made from carbon fibers.

15. The method according to claim 13, wherein the bracket includes a plate defining the bridge portion and having a pair of apertures and further including a pair of fasteners inserted through the apertures for defining the pair of legs.

16. The method according to claim 15, wherein the plate is made from metal.

17. The method according to claim 15, wherein the pair of fasteners include a pair of molly fasteners that are mechanically expanded to secure the fasteners in the holes.

18. The method according to claim 15, wherein said pair of fasteners are secured in the holes by an adhesive that is injected into the holes.

* * * * *